United States Patent
Flieger et al.

(10) Patent No.: US 6,412,306 B1
(45) Date of Patent: Jul. 2, 2002

(54) PROCESS FOR PRODUCING COMPOSITE BODIES FROM QUARTZ MATERIAL

(75) Inventors: Hans-Juergen Flieger, Jena-Kunitz; Karl-Heinz Schiecke; Werner Schmid, both of Jena; Dirk Schulze, Eberstedt; Peter Jochmann; Bernhart Sindzinski, both of Jena, all of (DE); Klaus Sivec, Villach (AT)

(73) Assignee: SICO Jena GmbH Quarzschmelze, Jena (DE)

( * ) Notice: Subject to any disclaimer, the term of this patent is extended or adjusted under 35 U.S.C. 154(b) by 0 days.

(21) Appl. No.: 09/607,646

(22) Filed: Jun. 30, 2000

(30) Foreign Application Priority Data

Jul. 1, 1999 (DE) .......................... 199 30 817

(51) Int. Cl.$^7$ .......................... C03B 37/00; C03B 33/07
(52) U.S. Cl. .............................. 65/32.2; 65/36
(58) Field of Search ..................... 65/32.2, 36

(56) References Cited

U.S. PATENT DOCUMENTS 5,617,262 A * 4/1997 Ise et al. ..................... 359/846

FOREIGN PATENT DOCUMENTS

| DE | 29 08 288 | 1/1980 |
| DE | 31 41 919 A1 | 5/1983 |
| DE | 32 26 451 A1 | 1/1984 |
| DE | 44 40 104 A1 | 5/1995 |

OTHER PUBLICATIONS

English Abstract of DE 31 41 919 A1 May 1983.
English Abstract of DE 44 40 104 A1 May 1995.
English Abstract of DE 32 26 451 A1 Jan. 1984.
English Abstract of DE 29 08 288 Jan. 1980.

* cited by examiner

Primary Examiner—Christopher A. Fiorilla
(74) Attorney, Agent, or Firm—Reed Smith LLP

(57) ABSTRACT

A process for producing composite bodies from a plurality of molded pieces made from quartz materials of different or identical structure, preferably fused quartz and/or fused silica. Also, composite bodies produced according to this process. A prismatic molded piece with a rectangular bottom surface and top surface and four plate-shaped molded pieces whose dimensions are tailored to the outer surfaces of the prismatic molded piece are produced in a first step, the plate-shaped molded pieces are then fixed to the outer surfaces of the prismatic molded piece, the prismatic molded piece and the plate-shaped molded pieces are heated together under protective gas to a predetermined temperature $T_e$ above the softening temperature of the quartz material and then cooled, resulting in a prismatic composite body which is joined thermally in a material engagement and which can be severed to form a series of plate-shaped composite bodies.

10 Claims, 3 Drawing Sheets

View A

View B

PROCESS FOR PRODUCING COMPOSITE BODIES FROM QUARTZ MATERIAL

BACKGROUND OF THE INVENTION a) Field of the Invention

The invention is directed to a process for producing composite bodies from a plurality of molded pieces made from quartz materials of different or identical structure, preferably fused quartz and/or fused silica. The invention is further directed to composite bodies produced according to this process.

b) Description of the Related Art

The generic type of composite bodies of quartz material to which the invention also belongs is used primarily as supporting or carrying plates for intermediate products in semiconductor fabrication, for example, for silicon disks and wafers, and also in high-temperature processes which take place, above all, under cleanroom conditions. They are also conventionally used in technological processes in the optics and chemicals industries.

The composite bodies which are usually constructed so as to be plate-shaped are generally formed from a large-area rectangular fused-quartz plate which is provided with an edge of fused silica. The thickness of a composite body used as a support of this type ranges from 4 mm to 10 mm. The fused quartz plate provides the actual supporting surface, while the edge has the function of reducing the flow of heat from the object, via the fused quartz plates, toward the edge areas during thermal processing or machining steps directed to the supported object and to keep the heat in the support area as far as possible.

In the production of plate-shaped composite bodies of this type, the special nature of the physical and chemical properties of the quartz material must be taken into account, with the result that special technologies had to be developed. Accordingly, it is known, for example, to produce composite bodies of the type mentioned above separately from a fused quartz plate cut in rectangular shape and four fused silica edge pieces, the fused silica edge pieces generally being connected with the fused quartz plate by welding with a hydrogen flame. It is also known to connect by gluing instead of by welding.

It is disadvantageous that this production process is extremely cost-intensive because the individual fabrication of the fused quartz plates and fused silica edge pieces, as well as their connection with one another, is very time-consuming. Further, there is a very large amount of wasted quartz material. Increasing production piece numbers, for instance, in the semiconductor industry, also require the development of production methods by which the described composite bodies can be produced much more efficiently.

Moreover, individual fabrication is also disadvantageous due to the limited repeating accuracy from one composite body to the next with respect to dimensional stability as well as accuracy of geometric shape.

Further, cracks also frequently form in the material due to the mechanical stresses resulting from varying expansion of the parts that are joined to one another or because of inhomogeneous material expansion due to locally limited application of the welding flame.

Insofar as gluing connections are selected over welding connections, the composite bodies produced in this way cannot be used in the high-temperature range because the applicable glue connections can only withstand temperatures of up to about 300° C. and, further, the glued locations also exhale gas when heated, which is undesirable in many technical processes.

The production of one-piece fused quartz plates is known from DE-OS 32 26 451, in which plates are sawed from a fused quartz cylinder and subsequently cut to the desired shape, e.g., a rectangle. However, this publication makes no reference to the production of plate-shaped composite bodies from a plurality of quartz materials.

It is also already known to produce tube-shaped and/or flange-shaped composite bodies from fused silica and fused quartz, as is described, for example, in DE 29 08 288, DE 31 41 919 and DE 44 40 104. However, the processes indicated in these references are not applicable to the production of plate-shaped composite bodies suitable as supports for the purposes mentioned above.

OBJECT AND SUMMARY OF THE INVENTION

Proceeding from the disadvantages in the prior art mentioned above, it is the object of the invention to provide a process of the type mentioned in the beginning which enables an economical series manufacture with high material yields and high repeating accuracy and in which cracking is prevented to a great extent at the same time.

According to the invention, this object is met in that a prismatic molded piece with a rectangular bottom surface and top surface and four plate-shaped molded pieces whose dimensions are tailored to the outer surfaces of the prismatic molded piece are produced in a first step, the plate-shaped molded pieces are then fixed to the outer surfaces of the prismatic molded piece, the prismatic molded piece and the plate-shaped molded pieces are heated together under protective gas to a predetermined temperature $T_\epsilon$ above the softening temperature of the quartz material and then cooled, resulting in a prismatic composite body which is joined thermally in a material engagement.

In a preferred arrangement of the invention, the plate-shaped molded pieces are fixed to the outer surfaces of the prismatic molded piece using a graphite mold. Further, it has proven advantageous when the temperature $T_\epsilon$ is maintained for a predetermined time period $t_\epsilon$.

The prismatic composite body formed in this way can be cut repeatedly parallel to its bottom surface or top surface for the purpose of producing a series of plate-shaped composite bodies, wherein the thickness of the plate-shaped composite bodies is determined in each instance by the distance from one cutting plane to the next cutting plane.

Accordingly, in the process according to the invention, a larger prismatic or block-shaped composite body which is joined thermally in material engagement is first produced from quartz materials of different or identical structure, but with expansion coefficients which are always at least approximately identical, and a series of plate-shaped composite bodies with identically shaped contours are then obtained therefrom.

In this way, a locally limited heating during production is advantageously avoided and composite bodies are obtained which are free from stresses or low in stresses. The risk of cracking and its deleterious consequences can virtually be ruled out. The joint zone is narrowly defined geometrically and is not surrounded by a mixed zone of materials of the adjoining molded pieces.

Accordingly, application of the process according to the invention enables an economical series manufacture of plate-shaped composite bodies with a high material yield and relatively little waste.

In a particularly preferred arrangement of the process according to the invention, the fixing of the molded pieces is carried out using a graphite mold. Further, it is provided that the plate-shaped molded pieces are fixed to the outer surfaces of the prismatic molded piece in such a way that the connection surfaces of every two adjoining molded pieces facing each other are inclined relative to one another at an angle α, wherein the molded pieces are oriented relative to one another in such a way that the distance between these surfaces is greater in the direction opposite to the direction of gravitational force. This has the advantageous result that the gases inevitably occurring during the heating and holding periods can escape upward from the joint gap unimpeded, while the connection of the respective surfaces and molded pieces proceeds from the bottom to the top opposite the direction of gravitational force; in particular, joint zones which are free from bubbles or have few bubbles are achieved in this way.

It has proven particularly advantageous to heat the molded pieces held in the graphite mold at a heating rate of 5 to 10° C. per minute to a temperature $T_\epsilon$ of 1710° C. to 1790° C. The holding time $t_\epsilon$ should advisably be 3 to 8 hours.

The cooling of the thermally joined block-shaped composite body is advantageously carried out in a defined manner at a cooling rate of 0.1 to 1° C. per minute.

The individual plate-shaped composite bodies can be cut from the block-shaped composite body parallel to the bottom surface by means of different methods; however, sawing by means of a diamond saw has proven advisable.

The process is also advantageously applicable for the production of correspondingly joined bodies from molded pieces made from materials that are materially related to quartz materials.

The object is further met according to the invention by a plate-shaped composite body which is produced by means of the process described above and which is formed of a plate with a rim or edge which extends around the entire circumference and is joined without intermediate layers in a material engagement.

In this respect, it is a substantial advantage that the joint zones of this composite body are narrowly defined and not surrounded by a mixed zone of different materials of adjacent molded pieces. They are free from bubbles or have few bubbles and, as a result of the process according to the invention, the composite body has only negligible stresses, if any, so that cracks are not expected to occur in the material.

In a particularly advantageous arrangement, the large-area plate is made from fused quartz and the edge joined thereto is made from fused silica. In this way, especially when used as a support in high-temperature processes, a good retention of heat can be achieved in the plate or in the product placed on the fused quartz plate because the more porous edge made from fused silica has a lower heat conductivity compared with the fused quartz of the plate and, therefore, the heat cannot flow hastily into the edge.

In a further arrangement, the surface of the composite body comprising the plate and edge is ground and polished. The circumferential outer surface of the composite body is advisably rounded and polished or broken into facets and polished.

The invention will be described more fully in the following with reference to an embodiment example.

DESCRIPTION OF THE PREFERRED EMBODIMENTS

Figure 1:
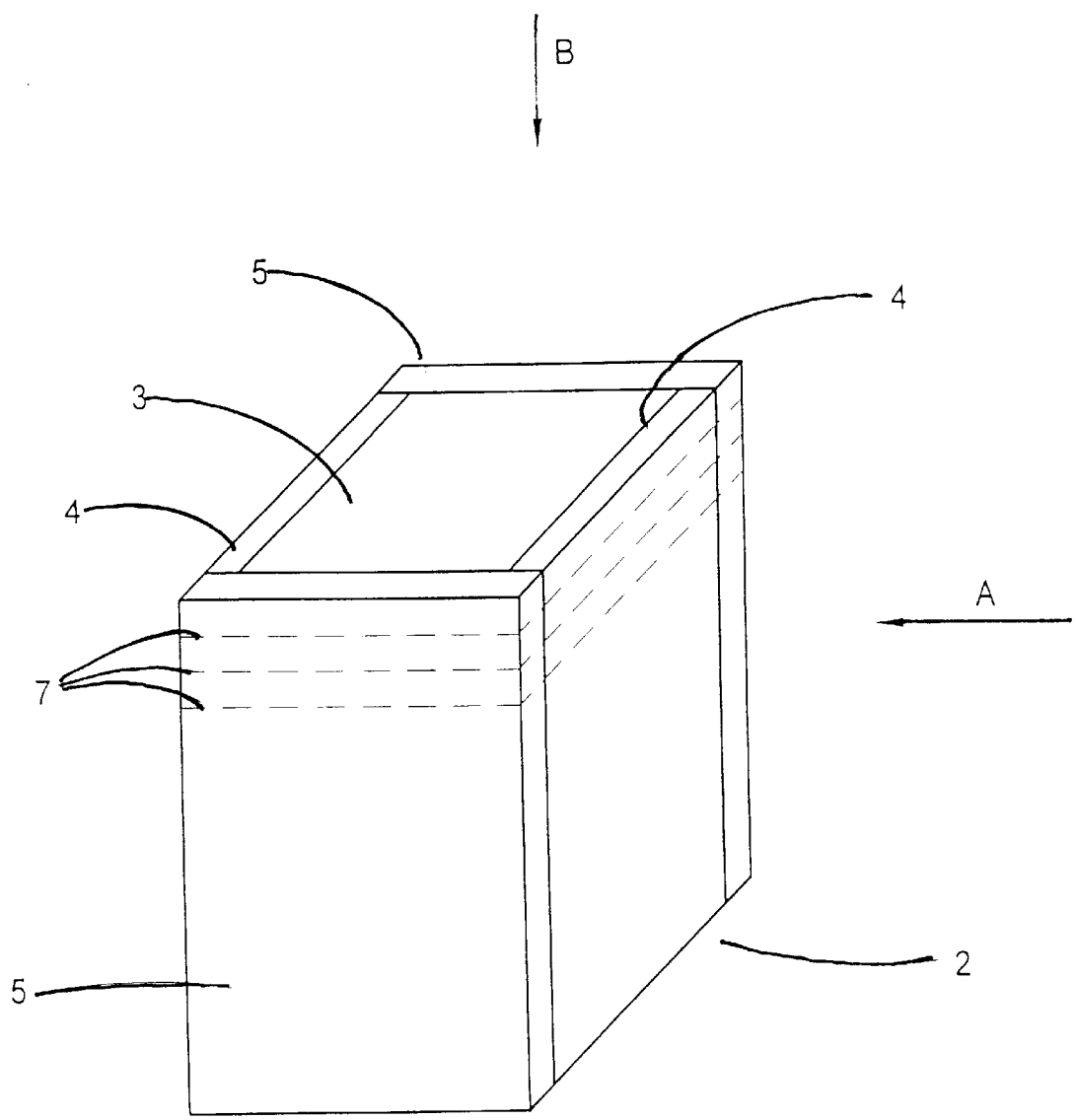
FIG. 1 a perspective view of a block-shaped composite body with indicated cutting planes for cutting into a plurality of individual plate-shaped composite bodies.

According to the process according to the invention, the production of plate-shaped composite bodies 1 from a block-shaped composite body 2 which is thermally joined in a material engagement is carried out in the following manner:

First, a prismatic molded piece 3 of fused quartz and two plate-shaped molded pieces 4, 5 of fused silica are produced by technological processes, known per se, e.g., by sawing from previously fabricated blocks. The dimensions of the plate-shaped molded pieces 4, 5 are adapted to the outer surfaces of the square molded piece 3 in such a way that the two plate-shaped molded pieces 4 have the same width as the square molded piece 3. The width of the two plate-shaped molded pieces 5 is greater than the width of the square molded piece 3 by twice the thickness of the molded pieces 4, so that the circumferential outer contour of the entire arrangement is planar also in the region of the joints.

Figure 2:
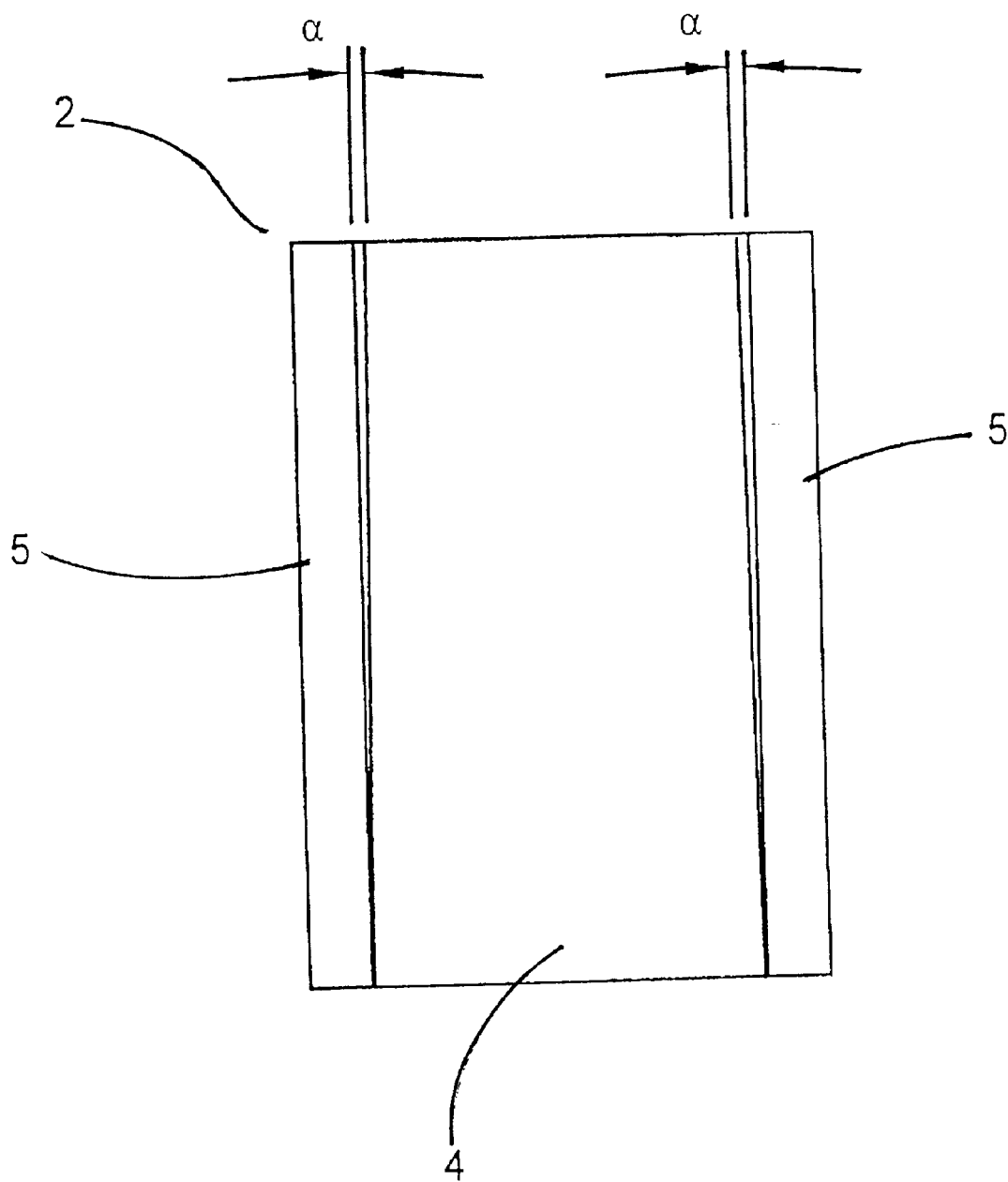
FIG. 2 view A from FIG. 1.

Subsequently, the plate-shaped molded pieces 4, 5 are fixed to the outer surfaces of the square molded piece 3 in such a way (as can be seen from FIG. 2, for example, from molded pieces 4 and 5) that all joint surfaces which face one another are inclined relative to one another at an angle a which is advantageously between 0.5° and 5°, resulting in a joint groove which opens upward, i.e., opposite to the direction of gravitational force, in a V-shaped manner, which enables gases to escape upward during the subsequent thermal process, while the joining process proceeds upward from the bottom. For the orientation and fixing of the molded pieces 3, 4 and 5 relative to one another, it is advisable to use a graphite mold (not shown in the drawing) which receives the molded pieces 3, 4 and 5 and is introduced into a furnace together with them.

In the next process step, the fixed molded pieces 3, 4 and 5 are heated under protective gas to the range of the softening temperature $T_\epsilon$, approximately 1750° C., at a heating rate of 5 to 10° C. per minute. The temperature is maintained for a period $t_\epsilon$ of 3 to 8 hours.

Under these thermal conditions, the molded pieces 3, 4 and 5 are joined in a material engagement to form a block-shaped composite body 2. It may be assumed that the cause of this joining process is a process whereby a material engagement connection of the contacting joint surfaces is produced by welding. In so doing, the V-shaped joint groove is filled gradually in the course of the thermal process, so that it is no longer present in the finished composite body 2 (in contrast to the view in FIG. 2 which serves merely for purposes of illustration). This also benefits the exhalation of gas described above.

This process step is followed by a defined cooling of the block-shaped composite body 2. For purposes of fine cooling, a cooling rate of 0.1 to 1° C. per minute is maintained.

The joint zone occurring in this thermal process is quite narrowly defined with respect to its spatial extension and is not surrounded by a mixed zone of the two materials of the molded pieces 3, 4 and 5 taking part in the joining. It has been shown that this joint zone has no bubbles or only a very small number of bubbles, which is particularly advantageous with respect to the subsequent use of the plate-shaped composite body 1. Also, the block-shaped composite body 2 produced according to the invention has hardly any thermally induced stresses.

A plurality of composite bodies 1 can now be obtained from the block-shaped composite body 2. This is carried out by sawing with a diamond saw (not shown) parallel to the bottom surface or top surface of the block. Several cutting planes 7 are indicated in FIG. 1.

Figure 3:
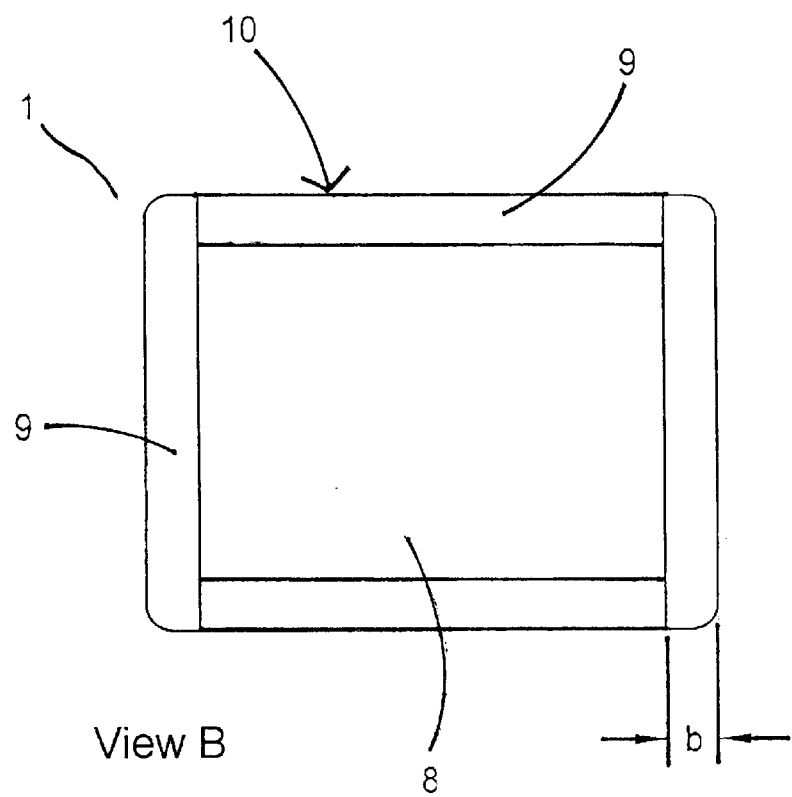
FIG. 3 view B from FIG. 1.

The plate-shaped composite body 1 produced according to this process, shown in a top view in FIG. 3, comprises a large-area plate 8 of fused quartz (the material of the square molded piece 3) and the edge 9 of fused silica which is joined to the latter in a material engagement and which has a width b.

Depending on the purpose for which the plate-shaped composite body 1 is used subsequently, the surface of the plate 8 and edge 9 is ground and polished. As a result, the surface should be sufficiently planar, so that a tightly closing contact is ensured.

Figure 4:
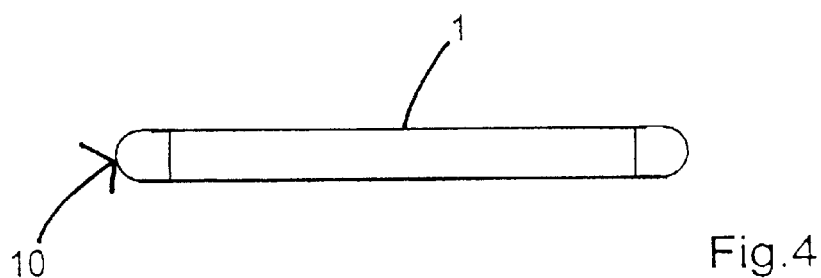
FIG. 4 a first variant of a plate-shaped composite body in a side view.
Figure 5:
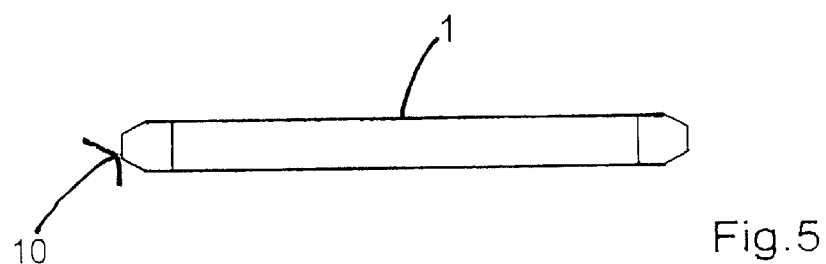
FIG. 5 a second variant of a plate-shaped composite body in a side view.

According to FIG. 4, the circumferentially extending outer surface 10 of the plate-shaped composite 1 is rounded and fire-polished. On the other hand, in a constructional variant shown in FIG. 5, the outer surface 10 is broken into facets and likewise fire-polished.

It should be noted that the invention is not limited to the embodiment examples and variants mentioned above. For example, it is likewise conceivable, in contrast to the preceding description, to construct the prismatic molded piece 3 from fused silica and the molded pieces 4, 5 from fused quartz or to provide pairs of fused quartz/fused quartz and fused silica/fused silica. Moreover, the invention is, of course, also suitable for application in materials which are materially related to quartz materials.

While the foregoing description and drawings represent the preferred embodiments of the present invention, it will be obvious to one skilled in the art that various changes and modifications may be made therein without departing from the true spirit and scope of the present invention.

Reference Numbers
1 plate-shaped composite body
2 block-shaped composite body
3 prismatic molded piece
4 plate-shaped molded piece
5 plate-shaped molded piece
6
7 cutting plane
8 plate
9 edge
10 outer surface
b edge width
α angle

What is claimed is:

1. A process for producing composite bodies from a plurality of molded pieces made from quartz materials of different or identical structure, preferably fused quartz and/or fused silica, comprising the steps of:

producing a prismatic molded piece with a rectangular bottom surface and top surface and four plate-shaped molded pieces whose dimensions are tailored to the outer surfaces of the prismatic molded piece in a first step;

then fixing the plate-shaped molded pieces to the outer surfaces of the prismatic molded piece;

heating the prismatic molded piece and the plate-shaped molded pieces together under protective gas to a temperature $T_\epsilon$ above the softening temperature of the quartz material and then cooling it resulting in a prismatic composite body which is joined thermally in a material engagement;

wherein the plate-shaped molded pieces are fixed to the outer surfaces of the prismatic molded piece in such a way that the surfaces facing each other are inclined relative to one another at an angle α, wherein the distance between the surface increases opposite to the direction of gravitational force.

2. The process according to claim 1, wherein the plate-shaped molded pieces are fixed to the outer surfaces of the prismatic molded piece using a graphite mold.

3. The process according to claim 1, wherein the temperature $T_\epsilon$ is maintained for a predetermined time period $t_\epsilon$.

4. The process according to claim 1, wherein the prismatic composite body is severed repeatedly parallel to and at different distances from the bottom surface or top surface, wherein plate-shaped composite bodies are formed.

5. The process according to claim 4, wherein the cutting of the prismatic composite body into plate-shaped composite bodies is carried out with a diamond saw.

6. The process according to claim 1, wherein the heating is carried out so as to increase by 5 to 10° C. per minute to a temperature $T_\epsilon$ of 1710° C. to 1790° C.

7. The process according to claim 1, wherein temperature $T_\epsilon$ is maintained for a period $t_\epsilon$ of 3 to 8 hours.

8. The process according to claim 1, wherein the cooling is carried out at 0.1 to 1° C. per minute.

9. A process for producing composite bodies from a plurality of molded pieces made from quartz materials of different or identical structure, preferably fused quartz and/or fused silica, comprising the steps of:

producing a prismatic molded piece with a rectangular bottom surface and top surface and four plate-shaped molded pieces whose dimensions are tailored to the outer surfaces of the prismatic molded piece in a first step;

then fixing the plate-shaped molded pieces to the outer surfaces of the prismatic molded piece;

heating the prismatic molded piece and the plate-shaped molded pieces together under protective gas to a temperature $T_\epsilon$ above the softening temperature of the quartz material and then cooling it resulting in a prismatic composite body which is joined thermally in a material engagement;

wherein the prismatic composite body is severed repeatedly parallel to and at different distances from the bottom surface or top surface, wherein plate-shaped composite bodies are formed.

10. The process according to claim 9, wherein the cutting of the prismatic composite body into plate-shaped composite bodies is carried out with a diamond saw.

* * * * *